Oct. 27, 1953
H. E. SIMI
2,656,779
VENTILATION OF PASSENGER COMPARTMENT
OF AUTOMOTIVE BUSSES
Filed Aug. 21, 1948
2 Sheets-Sheet 1
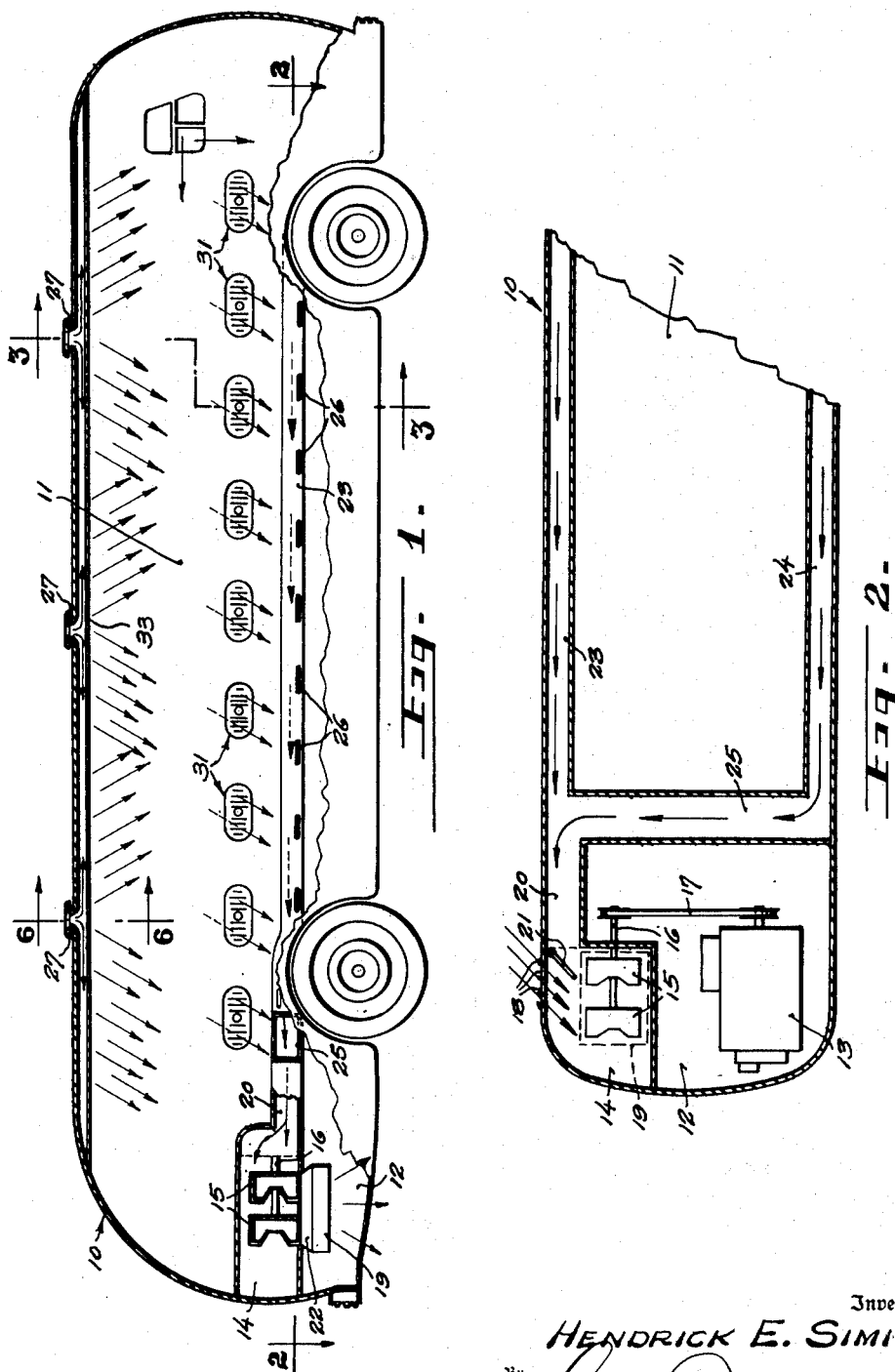
Inventor
HENDRICK E. SIMI
Attorney Oct. 27, 1953   H. E. SIMI   2,656,779
VENTILATION OF PASSENGER COMPARTMENT
OF AUTOMOTIVE BUSSES
Filed Aug. 21, 1948   2 Sheets-Sheet 2

Inventor
HENDRICK E. SIMI
By
Attorney

Patented Oct. 27, 1953

2,656,779

UNITED STATES PATENT OFFICE 2,656,779

VENTILATION OF PASSENGER COMPARTMENT OF AUTOMOTIVE BUSES

Hendrick E. Simi, Seattle, Wash., assignor to Kenworth Motor Truck Corporation, Seattle, Wash., a corporation of Washington Application August 21, 1948, Serial No. 45,448

3 Claims. (Cl. 98—10)

This invention relates to the ventilation of the passenger compartment of automotive busses, and has for its general object the provision of a perfected system of ventilation which will assure to the occupants of the compartment a constantly changing supply of evenly diffused fresh air and which will, moreover, effectuate this end irrespective of whether the vehicle is moving or standing still, requiring only that the engine be operating.

It is a further important object to devise a ventilation system which permits the occupants of the passenger compartment to variably increase the supply of fresh air in the immediate vicinity of the seats which they individually occupy without, in so doing, effecting the condition of ventilation which obtains in the balance of the compartment.

The invention has the further object of engineering a perfected ventilation system in which air drawn into the bus by a blower performs the important end, over and above the ventilation of the passenger compartment, of cooling the engine which powers the bus. As an object ancillary thereto, the invention aims to provide a system in which the performance of these two important ends is so attained as to accomplish the ventilation of the passenger compartment prior to the cooling of the engine and which, to all practical purposes, substantially precludes the air used to cool the engine from being again re-introduced into the passenger compartment.

Other and yet more particular objects and advantages will, with the foregoing, appear and be understood in the following description and claims, the invention consisting in the novel arrangement and in the adaptation and combination of parts hereinafter described and claimed.

In the accompanying drawings:

Figure 1 is a more or less schematic view partly in elevation but principally in longitudinal vertical section, illustrating an automotive bus embodying a ventilation system produced in accordance with the preferred teachings of the present invention, the section line being shown at 1—1 of Fig. 3.

Fig. 2 is a fragmentary horizontal sectional view on line 2—2 of Fig. 1.

Figure 4:
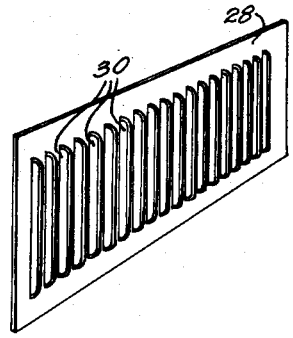
Figs. 4 and 5 are enlarged perspective views illustrating the exterior and interior plate fittings for the shutter-type wall vents which the system desirably incorporates.

Designated generally by the numeral 10, the coach body to which the ventilation system of the present invention is applied has the usual main compartment 11 with multiple seats (not shown) to accommodate the driver and passengers, and additionally provides a separate compartment for the vehicle's power plant and associated mechanism located, by preference, at the rear end of the body. This rear-end compartment is shown as being partitioned into two chambers and one of these chambers, designated 12, houses the engine proper, denoted 13, while there is introduced within the other compartment 14 one or more blowers 15. In the drawings I have illustrated the bus as employing two blowers placed co-axially and driven by a common arbor 16 powered from the drive shaft of the engine by a V-belt 17. Desirably, although not necessarily, the axial line of the arbor runs in a direction fore-and-aft of the vehicle, and the centrally placed admission throats through which air is drawn into the fan housings face to the rear. The purpose thereof is to have these throats so placed as to cause the same to draw more or less equally from two available sources of air supply. One of such supply sources is the exterior atmosphere, in which case the air is taken directly into the chamber through wall vents 18, and the other of said supply sources is the passenger compartment, in which case the air is drawn into the chamber through an air-flow tunnel 20. There is provided in the blower chamber a suitable damper arranged and adapted to be controlled from the driver's seat and which functions to apportion the incoming air to either or both such admission openings. This damper, as I have elected to show the same, comprises a plate 21 pivot-mounted for swinging movement between two extremes of movement one of which closes off the tunnel 20 and the other of which closes off the wall vents 18.

The engine for the bus is of the water-jacketed character, and has its water-borne heat dissipated by transfer to the air stream issuing from the outlet side of the blowers. To this end water-circulating pipes (not shown) run between the water-jacketed engine and a radiator 19 placed to occupy a position in the path of discharge of the pressure air stream, the desirable arrangement being one in which the radiator is shrouded and has a confined column of pressure-air delivered to its core by a duct or ducts 22. The pushed air, following its passage through the finned area of the radiator core, may be exhausted directly to the atmosphere or it may be caused to first wash over the engine proper, the latter procedure being desirable in that it pressurizes the engine compartment to preclude road dust from entering the same. Engine fumes are evacuated with the exhausted column of air.

Figure 5:
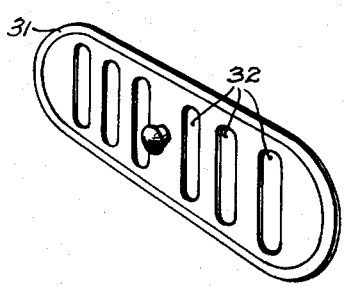
Figure 3:
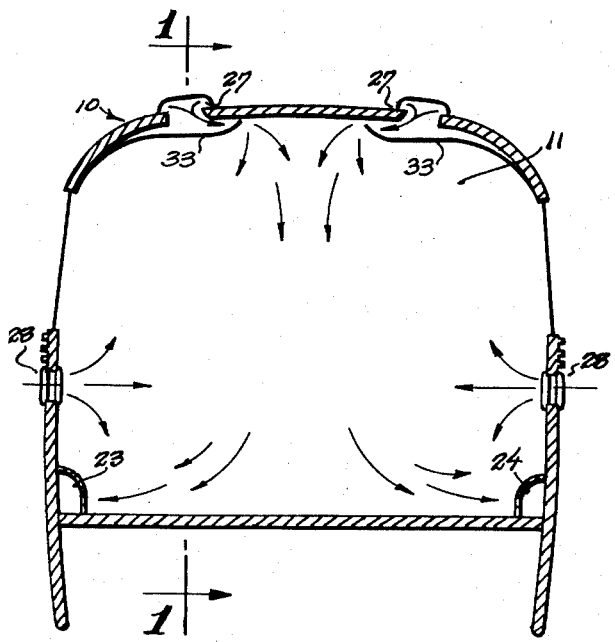
Fig. 3 is a transverse vertical sectional view on line 3—3 of Fig. 1.
Figure 6:
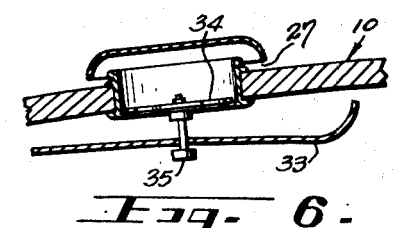
Fig. 6 is a transverse vertical sectional view taken to an enlarged scale on line 6—6 of Fig. 1 to detail the structural nature of the roof vents embodied in the system.

Leading from the passenger compartment of the vehicle, said tunnel 20 has air funneled thereto from branch-ducts 23 and 24 which occupy positions one at one side and the other at the other side of the compartment, these two branch-ducts connecting with the tunnel by a cross-manifold 25. The two branch-ducts each occupy a horizontal plane located below the level of the passenger seats, extend substantially the entire length of the passenger compartment, and are provided at spaced intervals of their length with slits 26 for the entry of air. Air flows into the passenger compartment through a severalty, six being shown, of roof vents 27, and also through wall vents. The roof vents are placed in two rows, three vents in each row, located at opposite sides of the vehicle's longitudinal median line and with the three vents in each row disposed one more or less central to the length of the passenger compartment and the other two adjacent each end thereof. The wall vents preferably correspond in number to the number of seats in the compartment and lie more or less at waist height immediately to the front of the related seat, but feasibly, albeit less advantageously in that control by each passenger of his or her individual comfort would be sacrificed, might be reduced in number so that a single wall vent would be provided for each of two adjacent seats and be accessible, for control, to the occupants of both seats. At the outside of the vehicle the vent openings for said seats are each covered by a plate 28 (Fig. 4) in which there are provided a multiplicity of vertical air-admission slits 30 each shrouded so as to cause air to be scooped into the slits when the vehicle is in motion. At the inside said wall vents are covered by a ventilator plate 31 (Fig. 5) with the openings 32 therein being opened and closed at will by a slidably mounted shutter.

The roof vents 27, as above stated, are arranged in two rows, one at each side of the vehicle's longitudinal median line, and the air entering the vehicle through the several vents in each row is directed into a common pocket running longitudinally of the vehicle immediately below the ceiling of the compartment, such pocket, which is defined between the ceiling and an underlying baffle 33, being open to the interior of the compartment along its inside edge and throughout its entire length. The roof vents admit of being controlled for flow capacity through operation of rotary shutters 34 governed by knobs 35 exposed below the baffle. The roof-venting arrangement self-evidently distributes the incoming air quite evenly throughout the length of the compartment, thus eliminating the drafts which occur where the introduction is localized at several points, and being fed into the compartment on the approximate longitudinal median line thereof assures a constant supply of fresh air to passengers seated along the aisle.

It is thought that the invention, and the manner of its working, will have been clearly understood from the foregoing description. Requiring only that the engine be operated to drive the blowers, air will perforce be drawn into the passenger compartment of the bus whether the vehicle is in motion or standing still, although the volumetric admission will increase somewhat when the vehicle is moving due to the scoop action which is provided in the ventilator design. The blowers, being inherently quiet in operation and being additionally mounted on rubberized antifriction bearings to dampen any vibration, produce little if any noise, and a careful acoustical treatment of the engine compartment and of the air passages leading thereto permits the engine of the bus to be run at high part-throttle speeds while standing still without creating any objectionable sound condition. Even outside the bus at the immediate rear of the engine compartment, individuals may converse in a normal speaking voice.

An accomplishment of no little importance in the present system is the fact that the air within the interior of the passenger compartment is diffused quite evenly throughout the same, and in consequence of having the air continually sucked therefrom maintains a pressure condition less than that of the outside atmosphere. By the continual movement of the air and the slight vacuum which said sucking withdrawal of the air creates, substantial air-conditioning is accomplished and an accelerated evaporation of perspiration takes place to establish a refreshing effect of coolness to the occupants of the compartment. It should, perhaps, be here pointed out that the windows as well as the floor, ceiling, and walls of the passenger compartment of the bus are 100% air-tight. By preference, the windows are set in individual rubber frames, these frames being of a character which, for safety purposes, permits the window to be bodily displaced from the frame by a force of fairly heavy pressure applied from the inside.

With the closed-type ventilation system of the present invention it is to be noted that liability of the air entering through the vents into the passenger compartment from being contaminated by exhaust fumes expelled from the rear end of the bus is so slight as to be substantially negligible, this being by reason of the high and forward location of the air-intake vents.

In point of capacity, and with the bus standing still, the blowers which I have used on installations so far made have been capable of moving approximately 2,000 cubic feet of air per minute through the passenger compartment when the engine is run at 1000 R. P. M., and this represents better than two complete changes of air per minute, which perforce is proportionately raised as the engine speed is accelerated to its governed speed of 2600 R. P. M.

It is my intention that no limitations are to be implied, and that the hereto annexed claims be given the broadest interpretation which the employed language fairly permits.

What I claim is:

1. A ventilating system for a passenger compartment, said system comprising a plurality of roof vents located in rows disposed one row at one side and the other row at the other side of the compartment's longitudinal median line and with the vents in each row spaced apart longitudinally of the compartment, a respective air-collecting pocket for each of said rows of vents extending longitudinally of the compartment for approximately the full length thereof, said pockets being each open to the interior of the compartment and being so formed as to serve the office of a baffle in that air introduced through the vents to the pocket is diverted from its vertical entering path and delivered through said opening horizontally into the interior of the compartment, the openings for the two pockets, one at one side and the other at the other side of the compartment's longitudinal median line, being opposed so that the ventilating air enters the compartment from both of said pockets along the inside edges of the pockets to merge one with the other body of entering air before distributing itself through the interior of the compartment, a longitudinally extending discharge duct located at the approximate floor level of the compartment and provided at spaced intervals of its length with openings through which air from the compartment is discharged into the duct, and suction means for inducing the discharge of air from the compartment into the duct.

2. A ventilating system for the passenger compartment of a vehicle, said system comprising a plurality of roof vents located in rows disposed one row at one side and the other row at the other side of the compartment's longitudinal median line and with the vents in each row spaced apart longitudinally of the compartment, a respective air-collecting pocket for each of said rows of vents extending longitudinally of the compartment for approximately the full length thereof, said pockets being each open to the interior of the compartment throughout approximately their entire length and being so formed as to serve the office of a baffle in that air introduced through the vents to the respective pocket is diverted from its vertical entering path and delivered through the related said opening horizontally into the interior of the compartment, a longitudinally extending discharge duct located at the approximate floor level of the compartment and provided at spaced intervals of its length with openings through which air from the compartment is discharged into the duct, and suction means for inducing the discharge of air from the compartment into the duct.

3. The ventilating system of claim 2 having along the side walls of the compartment a plurality of individual ventilator devices serving as means for introducing secondary supplies of fresh atmospheric air, the atmospheric openings to said ventilator devices presenting means for scooping air into the same under force of vehicle travel.

HENDRICK E. SIMI.

References Cited in the file of this patent

UNITED STATES PATENTS

| Number | Name | Date |
|---|---|---|
| 1,145,868 | Cooke | July 6, 1915 |
| 1,562,061 | Schneider | Nov. 17, 1925 |
| 1,594,894 | Masury | Aug. 3, 1926 |
| 1,750,178 | MacLeod | Mar. 11, 1930 |
| 1,987,456 | Woodard | Jan. 8, 1935 |
| 2,083,059 | Fageol | June 8, 1937 |
| 2,089,799 | Hulse | Aug. 10, 1937 |
| 2,147,906 | Lintern | Feb. 21, 1939 |
| 2,151,865 | Nallinger | Mar. 28, 1939 |
| 2,154,801 | Anderson et al. | Apr. 18, 1939 |
| 2,171,622 | Calkins | Sept. 5, 1939 |
| 2,268,502 | Browne | Dec. 30, 1941 |
| 2,319,002 | Kramer | May 11, 1943 |
| 2,351,096 | Blue | June 13, 1944 |
| 2,593,094 | Blue | Apr. 15, 1952 |

FOREIGN PATENTS

| Number | Country | Date |
|---|---|---|
| 457,883 | Great Britain | Dec. 7, 1936 |
| 648,181 | Germany | July 24, 1937 |
| 874,329 | France | Apr. 27, 1942 |